United States Patent
Freed et al.

(10) Patent No.: US 12,323,422 B2
(45) Date of Patent: Jun. 3, 2025

(54) SECURE REMOTE ACCESS TO DEVICES ON OVERLAPPING SUBNETS

(71) Applicant: Cisco Technology, Inc., San Jose, CA (US)

(72) Inventors: Michael Freed, Pleasanton, CA (US); Madeline Y. Bernstein, Honalulu, HI (US); Ruben Erick Escolero, Piedmont, CA (US); Elango Ganesan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 17/687,838

(22) Filed: Mar. 7, 2022

(65) Prior Publication Data
US 2023/0067223 A1    Mar. 2, 2023

Related U.S. Application Data

(60) Provisional application No. 63/237,309, filed on Aug. 26, 2021.

(51) Int. Cl.
*H04L 9/40* (2022.01)
(52) U.S. Cl.
CPC ...... *H04L 63/0876* (2013.01); *H04L 63/0236* (2013.01); *H04L 63/0281* (2013.01); *H04L 63/083* (2013.01); *H04L 63/20* (2013.01)
(58) Field of Classification Search
CPC .......... H04L 63/0876; H04L 63/0236; H04L 63/0281; H04L 63/083; H04L 63/20; H04L 61/2514; H04L 61/256; H04L 61/3025; H04L 2101/345; H04L 2101/35; H04L 61/4511; H04L 63/10; H04L 67/025; H04L 63/0884; G06F 16/90335; G06F 16/955
See application file for complete search history.

(56) References Cited

U.S. PATENT DOCUMENTS

| | | | |
|---|---|---|---|
| 10,735,370 B1 | 8/2020 | Kandlur et al. | |
| 10,778,637 B2 | 9/2020 | Jeong et al. | |
| 11,477,176 B1 * | 10/2022 | Gupta | H04L 63/0428 |
| 2011/0208838 A1 | 8/2011 | Thomas et al. | |

(Continued)

FOREIGN PATENT DOCUMENTS

KR    20180124817    11/2018

OTHER PUBLICATIONS

"Identity-Aware Proxy", online: https://cloud.google.com/iap, accessed Jan. 26, 2022, 3 pages, Google Cloud.

(Continued)

*Primary Examiner* — Sm A Rahman
(74) *Attorney, Agent, or Firm* — BEHMKE INNOVATION GROUP LLC; James M. Behmke; James J. Wong

(57) ABSTRACT

In one embodiment, a remote access manager receives an access request from a client to remotely access a device on a local network. The remote access manager generates a universally unique identifier for the access request. The remote access manager sends a response to the client having a one-time use domain name system name that is based on the universally unique identifier. The remote access manager communicates with a web proxy to authorize the client to remotely access the device.

20 Claims, 6 Drawing Sheets

(56) References Cited

U.S. PATENT DOCUMENTS

| | | | | |
|---|---|---|---|---|
| 2013/0182712 A1* | 7/2013 | Aguayo | ............. | H04L 12/4633 |
| | | | | 370/395.53 |
| 2016/0226816 A1* | 8/2016 | Blinn | ................. | H04L 61/4511 |
| 2017/0374042 A1 | 12/2017 | James et al. | | |
| 2018/0034913 A1* | 2/2018 | Matthieu | ................. | H04L 67/52 |
| 2019/0334869 A1* | 10/2019 | Grant | ................. | H04L 61/5007 |

OTHER PUBLICATIONS

"What Is the Difference Between a Relative and an Absolute URL?", online: https://www.seoclarity.net/resources/knowledgebase/difference-relative-absolute-url-15325/, Nov. 25, 2019, accessed Jan. 26, 2022, 7 pages, seoClarity.

Perez, Gustavo, "How to configure One-Time URL in Thinfinity Remote Desktop Server", online: https://www.cybelesoft.com/blog/how-to-configure-one-time-url/, Dec. 18, 2019, accessed Jan. 26, 2022, 5 pages, Cybele Software, Inc.

"DNS Zone", online: https://en.wikipedia.org/wiki/DNS_zone, Dec. 12, 2021, accessed Jan. 26, 2022, 4 pages, Wikipedia Foundation, Inc.

"Homelabbity", online: https://www.reddit.com/r/homelab/comments/8qm1gf/setting_up_wildcard_dns_records_for_remote/, accessed Jan. 26, 2022, 15 pages, reddit.com.

\* cited by examiner

SECURE REMOTE ACCESS TO DEVICES ON OVERLAPPING SUBNETS

RELATED APPLICATION

This application claims priority to U.S. Prov. Appl. Ser. No. 63/237,309, filed on Aug. 26, 2021, entitled SECURE REMOTE ACCESS TO DEVICES ON OVERLAPPING SUB NETS, by Michael Freed, et al., the contents of which are incorporated herein by reference.

TECHNICAL FIELD

The present disclosure relates generally to computer networks, and, more particularly, to secure remote access to devices on overlapping subnets.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

Today, it is a common practice in many industrial environments to use a 'cookie-cutter' approach to deploying IoT devices, including the reuse of Internet Protocol (IP) addresses and subnets. Indeed, it is very common in factories for different cells, zones, bays, etc. having the same types of devices to have overlapping subnets, which greatly simplifies the deployment of those devices. However, overlapping subnets also present various challenges with respect to accessing a particular device, remotely.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
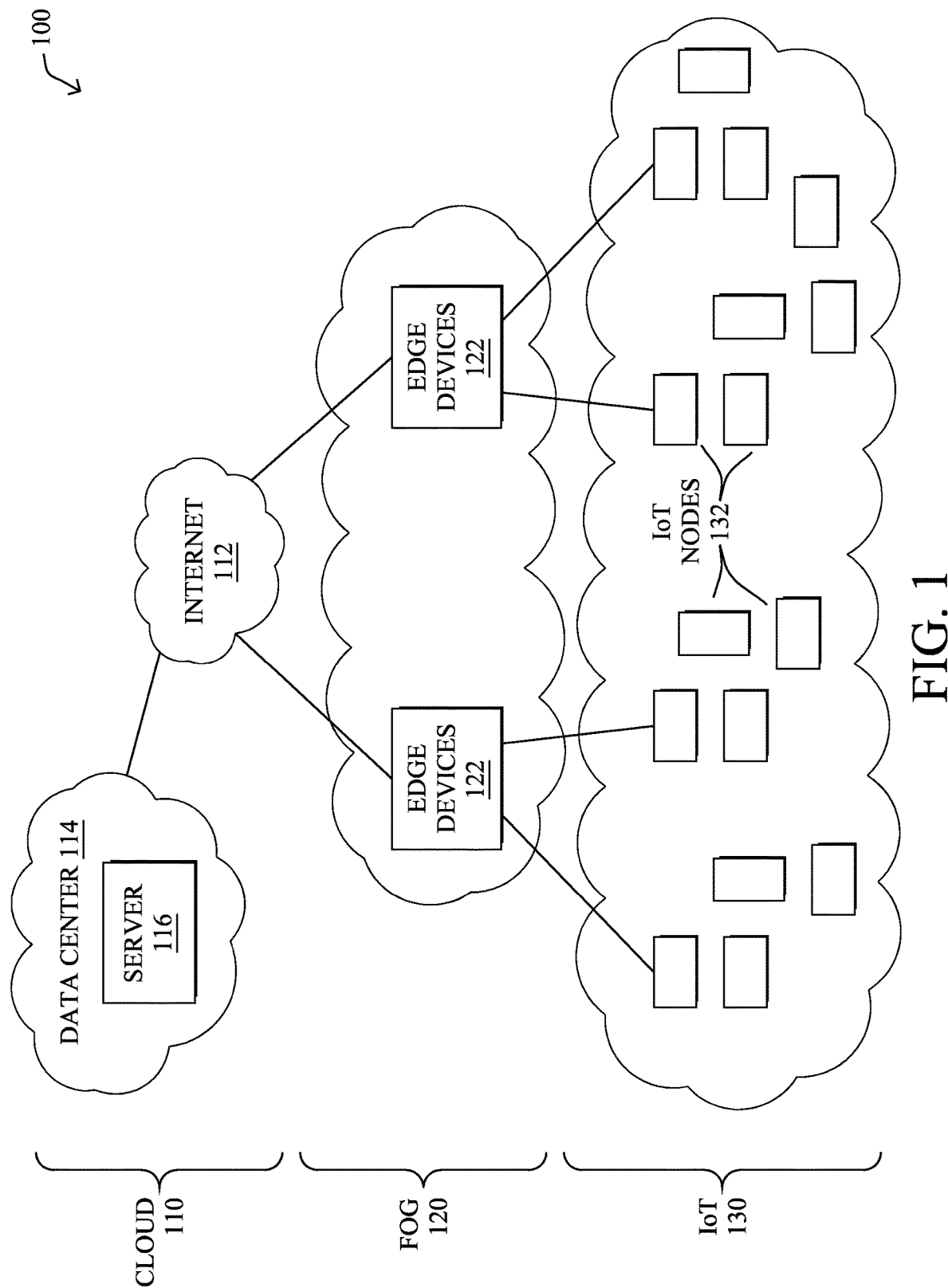
FIG. 1 illustrate an example network.

According to one or more embodiments of the disclosure, a remote access manager receives an access request from a client to remotely access a device on a local network. The remote access manager generates a universally unique identifier for the access request. The remote access manager sends a response to the client having a one-time use domain name system name that is based on the universally unique identifier. The remote access manager communicates with a web proxy to authorize the client to remotely access the device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
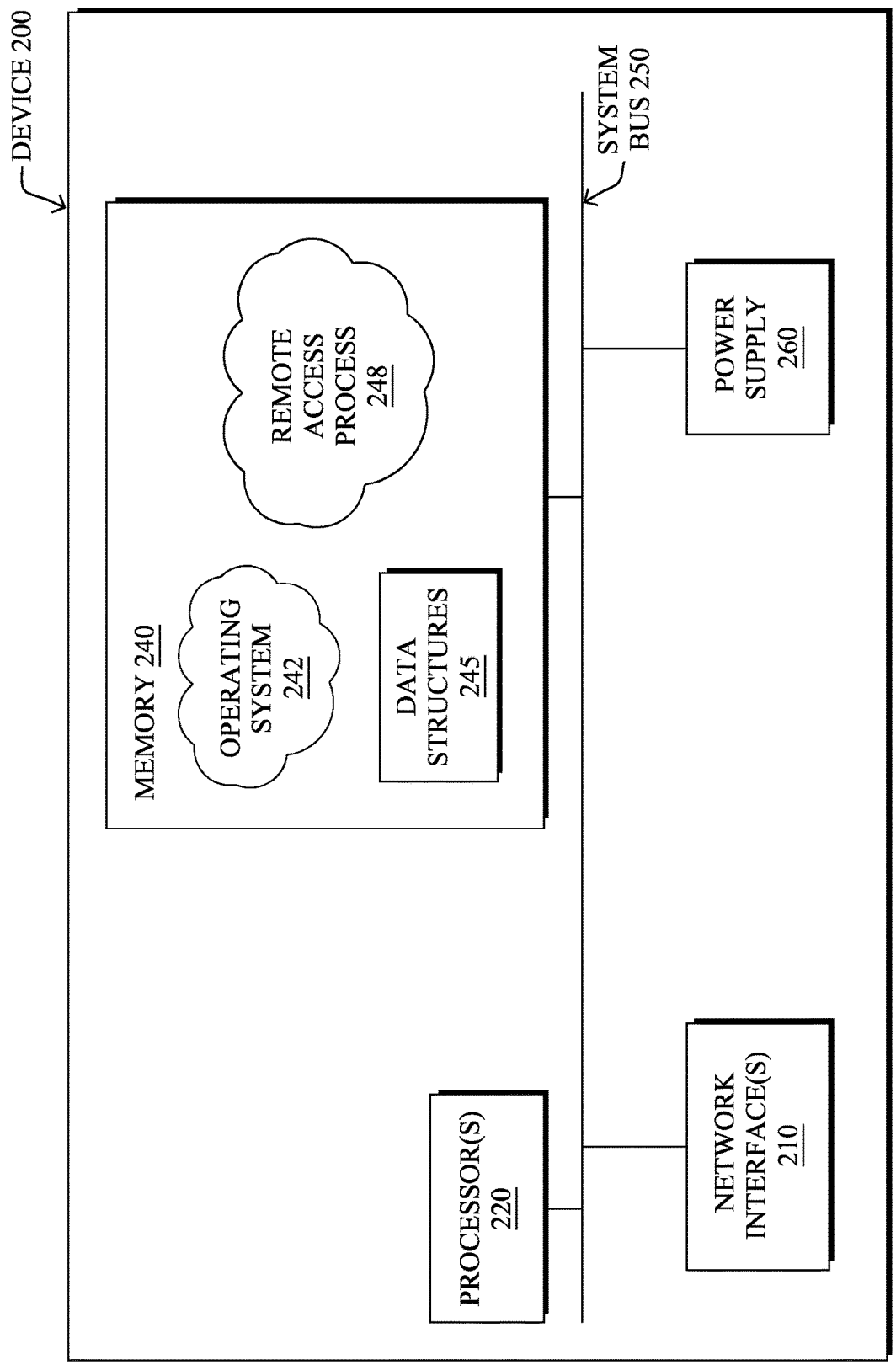
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative remote access process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many industrial IoT (IIoT) networks are now deployed using a 'cookie-cutter' approach whereby discrete manufacturing or other control segments are deployed using duplicate IP addresses. In other words, the network may comprise a plurality of units, such as cells, zones, bays, etc., with addresses being repeated across units. As a result, different devices may belong to overlapping subnets. In addition, these devices may be located behind one or more firewalls and/or network address translation (NAT) devices.

The above presents certain challenges to a remote access (RA) user that wishes to remotely access a web application server hosted by one of the endpoint IIoT devices at a particular location. For instance, assume that a particular robot has a web application server that allows a technician to review diagnostic data for that robot, make configuration changes, initiate software updates, and/or perform other maintenance functions. Typically, these web servers communicate using the Hypertext Transfer Protocol (HTTP) or, more likely, HTTP Secure (HTTPS). Because the target device is on an overlapping subnet, though, the client of the RA user and the target device cannot communicate, directly. This is often due to the fact that the target device is behind a NAT, firewall, etc. and does not have a public IP address.

Two potential approaches to remote access of devices on overlapping subnets rely on either:
1. Tunneling (e.g., using IPSec)
2. Web Application Proxies While both solutions can potentially address the issue, both require significant configuration to work. More specifically, the downsides to employing tunneling using IPSec for remote access are as follows:
1. An agent needs to be installed on the local device/client of the RA user.
2. IPSec does not easily allow for fine grained role based access control.
3. IPSec is often blocked from being used, for security reasons, since IPSec traffic is difficult, if not impossible, to inspect.
4. IPSec technology does not allow a user to be on two networks at the same time (e.g., a corporate network and the network of the remote device).

Additionally, if IPSec technology was deployed on the gateways of the remote site, in order to connect the gateway to the remote access service, then the gateway would no longer have access to the private network of the remote network.

Alternatively, a web application proxy could be used to facilitate remote access over HTTP(S) to a web server hosted by a remote device. However, standard web application proxies also do not allow for multiple devices that have different IP addresses, but are otherwise identical, to be distinguished.

For instance, consider the case of two robots having original URLs for login as follows:
robot 1: https://192.168.10.10:80/robot/login
robot 2: https://192.168.10.20:80/robot/login For remote access, a web application proxy would attempt to distinguish these devices by using device IDs in the URL path for each device login page, creating a mapping such that https://mycompany:443/url/dev001/login maps to https://192.168.10.10:80/robot/login for robot 1 and https://mycompany:443/url/dev002/login maps to https://192.168.10.20:80/robot/login for robot 2.

Now, the login page HTML might return an href to an absolute path such as the following:
<a href="/static/basic document.html">basic document</a>

This code would cause both URLs to become https://mycompany:443/static/basicdocument.html, losing the device ID and creating an invalid URL.

However, since it is likely that the RA user is connecting to third party IoT web servers, it cannot be assumed that they will only use relative paths, which has been observed via real-word testing. In addition, including absolute paths would require modification to the server code, which may not be feasible. Another possibility would be to include the device ID in a header to help distinguish between the different devices. This would, though, still require modification to the server code of the target device for which remote access is desired.

Secure Remote Access to Devices on Overlapping Subnets

The techniques introduced herein allow for the secure remote access to devices on overlapping subnets. In some aspects, the techniques herein support remote access to web application servers on such devices, without requiring the accessing client to install specialized software and/or reconfiguration. In further aspects, the techniques herein also support fine-grained, role-based access control to the devices.

Illustratively, the techniques described herein may be performed by hardware, software, and/or firmware, such as in accordance with remote access process 248, which may include computer executable instructions executed by the processor 220 (or independent processor of interfaces 210) to perform functions relating to the techniques described herein.

Specifically, in various embodiments, a remote access manager receives an access request from a client to remotely access a device on a local network. The remote access manager generates a universally unique identifier for the access request. The remote access manager sends a response to the client having a one-time use domain name system name that is based on the universally unique identifier. The remote access manager communicates with a web proxy to authorize the client to remotely access the device.

Figure 3:
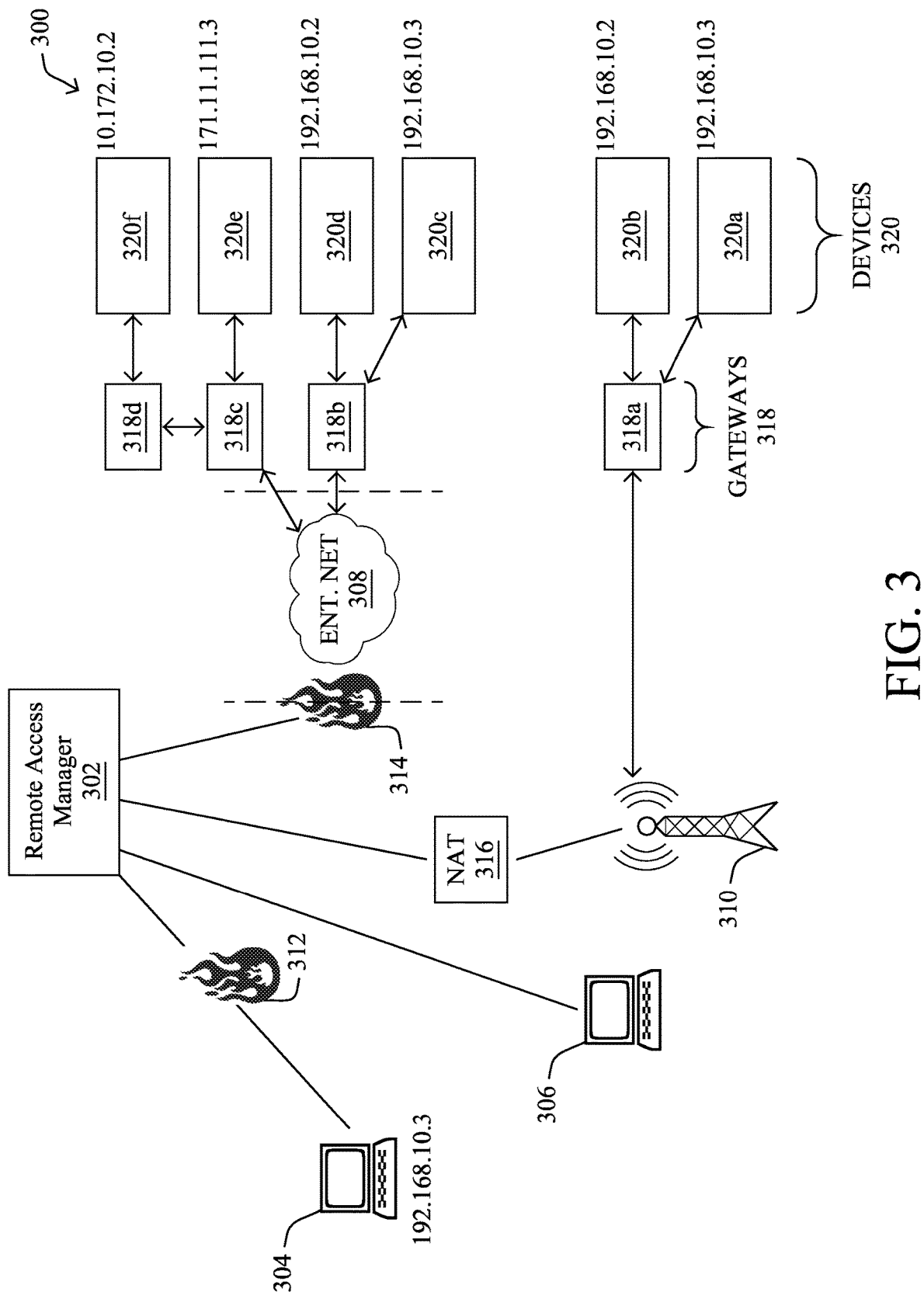
FIG. 3 illustrates an example of remote access to a device using a remote access manager.

Operationally, FIG. 3 illustrates an example 300 of remote access to a device using a remote access manager, according to various embodiments. As shown, assume that there are various endpoint IIoT devices 320 that are on a local network of a particular location, such as a factory, warehouse, or the like. In addition, assume that any or all of devices 320 each execute their own web application servers, allowing a technician to perform various functions such as reviewing diagnostic information, making configuration changes, and the like.

Typically, IIoT devices are often deployed in a way such that they are assigned IP addresses that overlap across different subnets. For instance, devices 320a-320b may be on a first subnet and devices 320c-320d may be on a second subnet, allowing both sets of devices to use overlapping IP addresses (e.g., 192.168.10.2 and 192.168.10.3). As noted, this presents challenges to remotely accessing their application web servers. Indeed, devices 320 may be behind different networking devices such as gateways 318, firewalls, such as firewalls 312-314, NATs, such as NAT 316, etc.

More specifically, as shown, devices 320a-320b are behind gateway 318a, which utilizes a cellular connection with a cell tower 310 and is behind NAT 316. Devices 320c-320d are behind gateway 318b, which is connected to an enterprise network 308 and behind a firewall 314. Likewise, device 320f is behind gateway 318d. Gateway 318d and device 320e are both behind gateway 318c, which is also connected to enterprise network 308 and behind firewall 314.

Remotely accessing the application web server of a particular device 320 is quite challenging under normal circumstances. For instance, say the RA user of client device 304 wishes to access the web server of device 320b. To enable such a connection, a tunnel could be established. However, doing so would also require an agent to be installed to both client device 304 as well as device 320b. In addition, IPSec suffers from various pitfalls such as the potential for it being blocked by a firewall, an inability to perform fine grained access control, and the like. Alternatively, a traditional web proxy could be used to enable the remote access connection between client device 304 and device 320b. Here, though, this is also not a tenable solution as device 320b shares the same local IP address as that of device 320d, meaning that a traditional web proxy would not be able to distinguish between the two and support remote access to both device 320b and device 320d.

According to various embodiments, the techniques herein propose the use of a remote access manager 302 that brokers and configures a remote connection between the remote client device 304 and device 320b on the local network of the location. In general, remote access manager 302 may take the form of one or more specifically configured devices (e.g., one or more devices 200 executing illustrative remote access process 248) that provide a remote access service to client devices, such as client device 304.

During use, an administrator operating a device 306 may interact with remote access manager 302 to configure access policies for devices 320. Such policies may be device-specific, user-specific, location-specific, or the like. For instance, one policy may allow the RA user of client device 304 access to only device 320b, while blocking their access to any of the other devices 320, such as based on their user identifier.

In various embodiments, remote access manager 302 may enable a remote access connection by assigning a one-time use/random Doman Name System (DNS) name for an individual device to be accessed, remotely. To do so, it may randomly generate a one-time use device ID for each connection to a remote device, which can then be included in the DNS name. This hides the internal network structure for security purposes.

As would be appreciated, a wildcard DNS record is a record in a DNS zone that matches requests for non-existent domain names. A wildcard DNS record uses '*' as the leftmost label (part) of a domain name, e.g. *.example.com. The wildcard DNS record allows any random connection ID to be a prefix of the DNS name, but still map back to the same service, thus making our solution scalable for thousands of devices.

Figure 4:
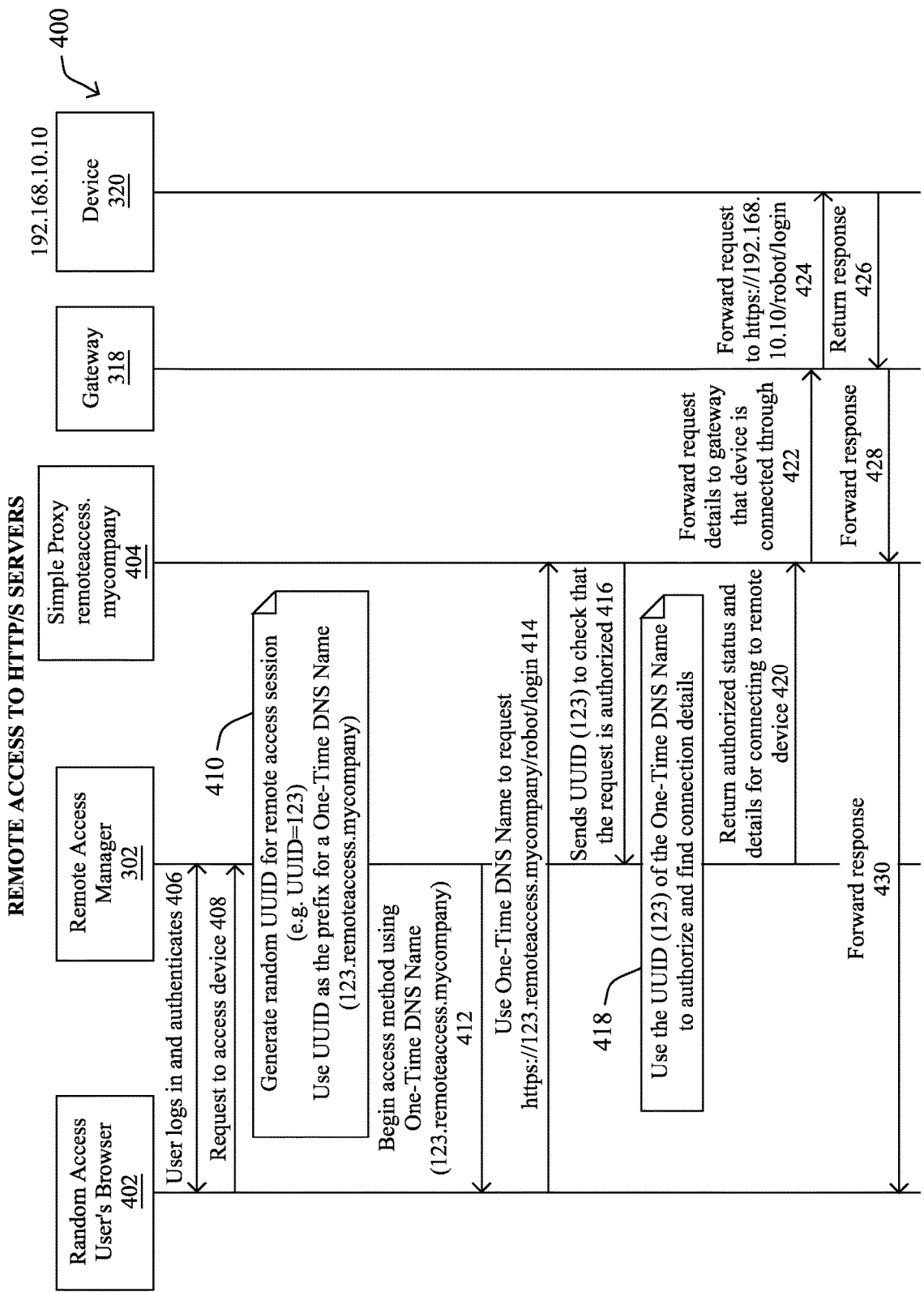
FIG. 4 illustrates an example workflow for providing remote access to a device.

FIG. 4 illustrates an example workflow 400 for providing remote access to a device, according to various embodiments. Continuing the example of FIG. 3, assume that the RA user of client device 304 operates their web browser 402 to log into the remote access service of remote access manager 302 and authenticating themselves to it, via exchange 406. For instance, the RA user may provide a username/user identifier, password, multifactor authentication information, or the like, to prove their identity to remote access manager 302.

Once authenticated and logged into the service of remote access manager 302, the RA user may then send a request 408 to remote access manager 302 to access a specific device 320 that is located in a local network behind a gateway 318. For example, the service of remote access manager 302 may provide a listing to web browser 402 of the devices to which the RA user is authorized to access. In turn, the RA user may operate their web browser 402 to select a particular device 320 that they wish to access.

According to various embodiments, at step 410 shown and in response to request 408, the service of remote access manager 302 may generate a random universally unique identifier (UUID) for the device 320 for which remote access was requested, such as a UUID of "123." As would be appreciated, this UUID is for exemplary purposes only and a UUID having a greater number of characters and/or types of characters (e.g., lower case letters, uppercase letters, numbers, and/or symbols) will help to further ensure the security of the system. In further embodiments, the remote access manager may use that UUID as part of a one-time DNS name for the device (e.g., "123.remoteaccess.mycompany") and return that DNS name to the client device of the RA user via response 412.

In some embodiments, a wildcard DNS entry may be registered with a DNS system, such that the one-time DNS name returned to web browser 402 will resolve to an address of a simple web proxy 404, which may be provided either directly by remote access manager 302 or another device in communication therewith. For instance, a DNS wildcard entry "*.remoteaccess.mycompany" may be registered to resolve to the IP address of web proxy 404 associated with the domain "remoteaccess.mycompany."

In turn, web browser 402 may send a request 414 to a Uniform Resource Locator (URL) comprising the one-time DNS name returned to it by remote access manager 302. For instance, the URL may take the form of "https://123.remoteaccess.mycompany/robot/login." Such a URL resolves to the address of web proxy 404, meaning that request 414 will be sent to web proxy 404.

After receiving request 414, web proxy 404 may extract the UUID from the URL to which request 414 was sent. Then, web proxy 404 may send an authorization request 416 to the service of remote access manager 302, to authorize the remote access to the device 320 associated with the UUID.

In various embodiments, remote access manager 302 may make a determination 418 as to whether request 414 is authorized based on any or all of the following:

- A match between the UUID in authorization request 416 and the UUID previously generated by remote access manager 302 and sent to web browser 402 via response 412.
- A determination that the UUID was not used, previously, thereby enforcing the one-time nature of the UUID and its corresponding DNS name. In some cases, remote access manager 302 may maintain a log of previously used UUIDs, so as to ensure that it does not generate the same UUID twice during step 410.
- Additional information about request 414, such as the IP address of the device that sent request 414, the geolocation of that device, etc. This can be used, for instance, to ensure that this information matches that of the device that sent request 408.

Based on determination 418, the service of remote access manager 302 may then send an authorization response 420 to web proxy 404. Such a response may also include the details needed to connect to the specific device 320 for which remote access is requested. For instance, remote access manager 302 may provide to web proxy 404 the address of the specific gateway 318 associated with the target device 320, address and/or subnet information for that device 320, and/or any other information that may be needed for web proxy 404 to form a connection with the particular device 320 (e.g., to account for any firewalls, NATs, etc. between web proxy 404 and the device 320).

Of course, if determination 418 by remote access manager 302 indicates that the requested remote access is not authorized, it may take any number of measures to block the connection. In a simple case, remote access manager 302 may respond to web proxy 404 with an indication that the requested remote access is not authorized. In another case, remote access manager 302 may not respond to authorization request 416 from web proxy 404, which may also be presumed to be a denial. In either case, web proxy 404 may not process request 414 further and either not respond to it or return a notification to web browser 402 that request 414 has been blocked.

Assuming that request 414 has been authorized by remote access manager 302, web proxy 404 may use the connection details from authorization response 420 to forward the request details as communication 422 to the specific gateway 318 associated with the target device 320. The gateway 318 then forwards the request onward to the target device 320 via communication 424. For instance, assume that the local IP address of the target device 320 is 192.168.10.10. In such a case, communication 424 may take the form of a request sent to the following URL: https://192.168.10.10/robot/login, which corresponds to the URL of the application web server executed by the target device 320.

In response to communication 424, the target device 320 may then return a response 426 to its gateway 318. This response is then forwarded as communication 428 by the gateway 318 back to web proxy 404 and then forwarded on by web proxy 404 back to web browser 402 as communication 430. Thus, even though the RA user and their client device does not have specific knowledge of the internal address of device 320, it may still access it remotely and in a secure manner. As would be appreciated, further exchanges between web browser 402 and the target device 320 may be performed in a similar manner, using web proxy 404 as an intermediary for the session.

As a result of the above, the local client device executing web browser 402 does not require any specialized software or reconfiguration, to access the target device 320. Conversely, the target device 320 itself does not require any modification of its application web server, to implement the techniques herein. Also, since the UUID and DNS name used for the transaction is of a one-time use nature, the security of the system is maintained, thereby preventing malicious entities from also accessing the target device.

Figure 5:
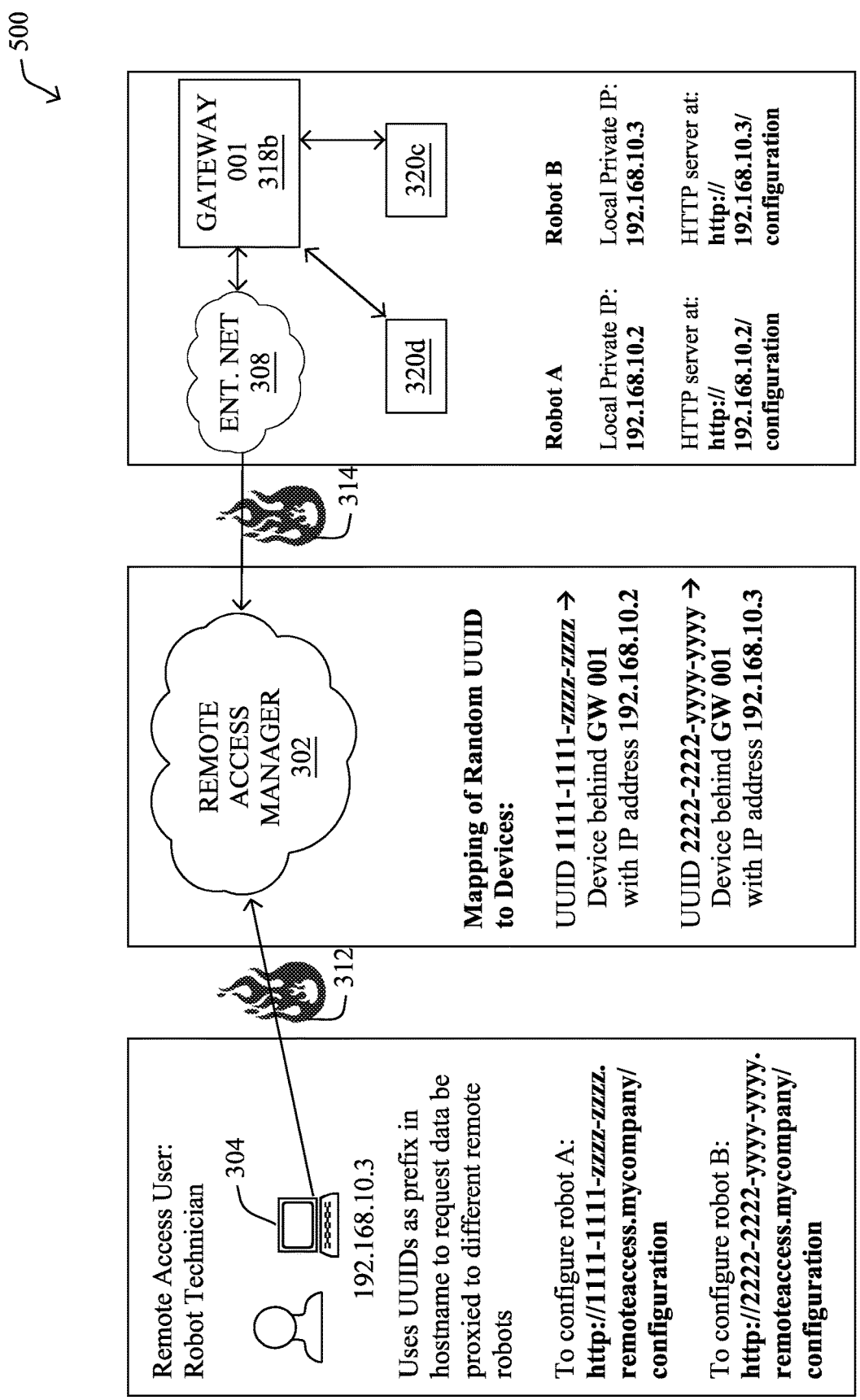
FIG. 5 illustrates an example of remotely accessing devices on overlapping subnets.

By way of example, FIG. 5 illustrates an example of how the techniques herein can be used to remotely access devices on overlapping subnets. As shown, assume that the RA user is a robot technician that operates client device 304 at a location that is remote from that of robots A and B at a particular site (e.g., devices 320*d*-320*c*). Each of these robots has a corresponding private IP address, 192.168.10.2 and 192.168.10.3, respectively.

Both robots have identical web servers where users can edit the configuration of an individual robot. The web servers can be reached at a URL of the form "http://<robot's IP>/configuration." On the local private network, the robots are easily distinguished by their local private IP addresses. For remote access, however, these IP addresses cannot be used.

Accordingly, in various embodiments, remote access manager 302 may generate a unique UUID that maps to a specific robot. Associated with each UUID may also be the details needed to form a connection to that robot, such as the address or identity of its corresponding gateway 318, such as gateway 318*b* in this instance, the local IP address of the target robot, or any other information needed for a web proxy to communicate with the target robot.

Remote access manager 302 then incorporates the UUID for the target robot into a unique hostname for access to that robot. Here, a wildcard DNS entry may also be set via a DNS resolver (e.g., a Route 53 resolver, etc.) to set *.remoteaccess.mycompany to map to remoteaccess.mycompany. In other words, any UUID may be used in place of the registered wildcard and the URL will still resolve to the address of the web proxy associated with remote access manager 302. In addition, the certificate names may also be set to include *.remoteaccess.mycompany and the cookie domains to .remoteaccess.mycompany, or whatever hostname is to be used. Note that the preceding dot in the cookie domain allows the cookies to work with a wildcard.

As a result, the following hostnames may be exposed to the client device 304 of the RA user:

Robot A's hostname: 1111-1111-zzzz-zzzz.remoteaccess.mycompany

Robot B's hostname: 2222-2222-yyyy-yyyy.remoteaccess.mycompany

Figure 6:
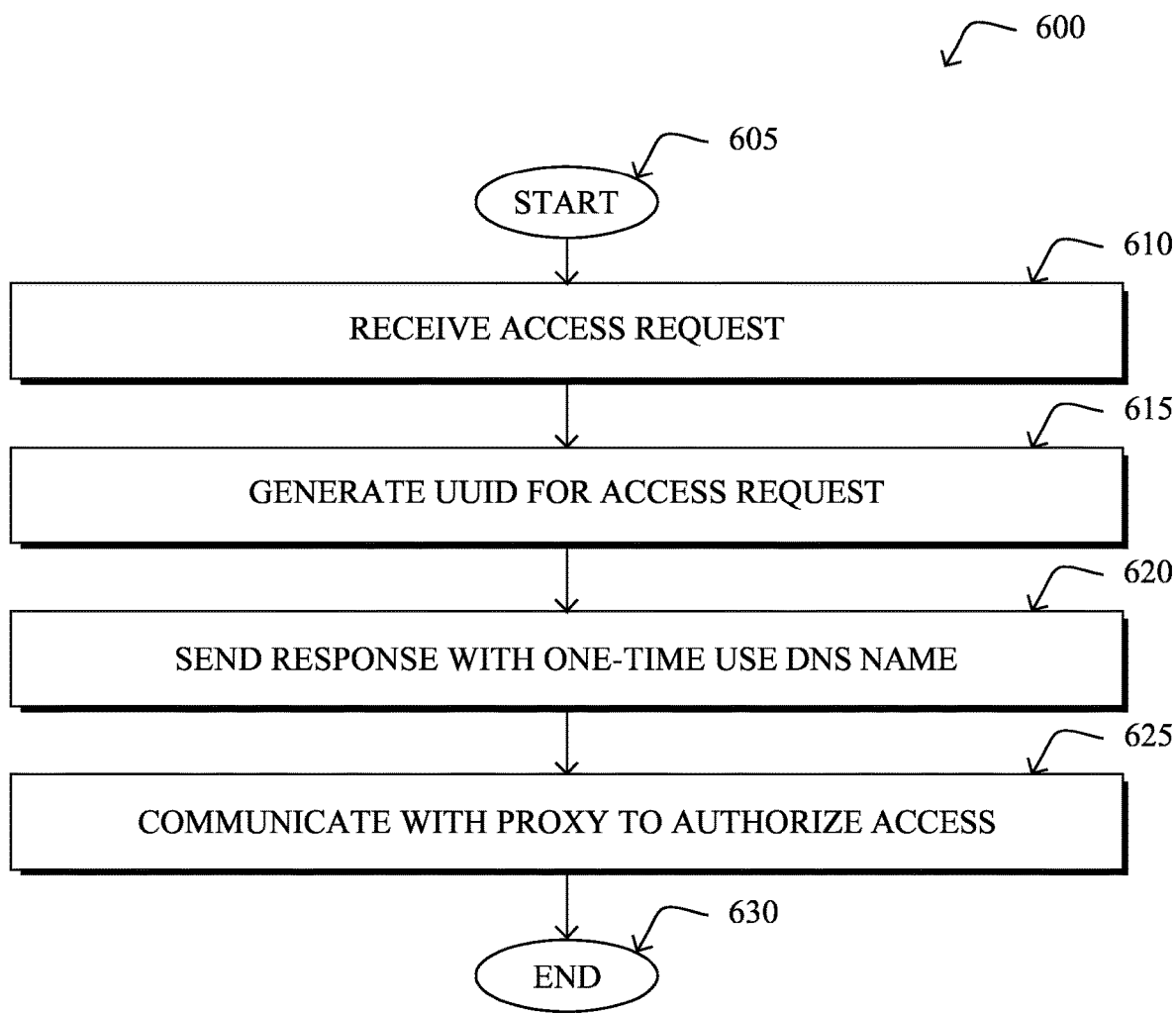
FIG. 6 illustrates an example simplified procedure for providing secure remote access to devices.

Since these hostnames are unique, the system can now distinguish between the configuration web servers of the two robots. In turn, client device 304 of the RA user can now request the following, which maps as follows:

Robot A's application:http://1111-1111-zzzz-zzzz.remoteaccess.mycompany/configuration→http://192.168.10.2/configuration Robot B's application: http://2222-2222-yyyy-yyyy.remoteaccess.mycompany/configuration→http://192.168.10.3/configuration FIG. 6 illustrates an example simplified procedure for providing secure remote access to devices, in accordance with one or more embodiments described herein. For example, a remote access manager, which may take the form of one or more non-generic, specifically configured devices (e.g., device 200) may perform procedure 600 by executing stored instructions (e.g., remote access process 248). The procedure 600 may start at step 605, and continues to step 610, where, as described in greater detail above, the remote access manager may receive an access request from a client to remotely access a device on a local network. In various embodiments, the device has an Internet Protocol (IP) address that is also used by another device in the local network on a different subnet.

At step 615, as detailed above, the remote access manager may generate a universally unique identifier (UUID) for the access request. In one embodiment, the remote access manager generates the universally unique identifier for the access request randomly.

At step 620, the remote access manager may a response to the client having a one-time use domain name system (DNS) name that is based on the UUID, as described in greater detail above. In some embodiments, the response to the client includes a uniform resource locator (URL) that points to the web proxy and comprises the one-time use domain name system name. In further embodiments, the one-time use DNS name uses the UUID as a prefix. In various embodiments, a wildcard DNS record may also be set that resolves to an address of the web proxy.

At step 625, as detailed above, the remote access manager may also communicate with a web proxy to authorize the client to remotely access the device. In one embodiment, the remote access manager does so, in response to receiving an authorization request from the web proxy. In some embodiments, the remote access manager may also provide identification information for the device to the web proxy, whereby the web proxy uses the identification information for the device to forward an access request from the client to the device. In turn, the access request is forwarded to the device via a gateway of the local network, in some embodiments. In other embodiments, the remote access manager may receive an authorization request from the web proxy that includes the universally unique identifier, after communicating with a web proxy to authorize remote access of the device of the local network by the client. In such a case, it may also deny that authorization request. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the remote access of IoT devices in a secure manner, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   receiving, at a remote access manager, an access request from a client to remotely access a device that is part of a subnet on a local network, wherein the local network comprises a different subnet for other devices that have some overlap in Internet Protocol addresses with devices that are part of the subnet;
   generating, by the remote access manager, a universally unique identifier for the access request;
   sending, by the remote access manager, a response to the client having a one-time use domain name system name that is based on the universally unique identifier; and
   communicating, by the remote access manager, with a web proxy to authorize the client to remotely access the device.

2. The method as in claim 1, wherein the remote access manager generates the universally unique identifier for the access request randomly.

3. The method as in claim 1, wherein the remote access manager communicates with the web proxy to authorize the client to remotely access the device, in response to receiving an authorization request from the web proxy.

4. The method as in claim 1, wherein the response to the client includes a uniform resource locator that points to the web proxy and comprises the one-time use domain name system name.

5. The method as in claim 4, wherein the one-time use domain name system name uses the universally unique identifier as a prefix.

6. The method as in claim 1, wherein the device has an Internet Protocol address that is also used by another device in the different subnet.

7. The method as in claim 1, wherein communicating, by the remote access manager, with the web proxy to authorize remote access of the device of the local network comprises:
   provide identification information for the device to the web proxy, wherein the web proxy uses the identification information for the device to forward an access request from the client to the device.

8. The method as in claim 7, wherein the access request is forwarded to the device via a gateway of the local network.

9. The method as in claim 1, further comprising:
receiving an authorization request from the web proxy that includes the universally unique identifier, after communicating with a web proxy to authorize remote access of the device of the local network by the client; and
denying that authorization request.

10. The method as in claim 1, further comprising:
setting a wildcard domain name system record in a domain name system that resolves to an address of the web proxy.

11. An apparatus, comprising:
one or more network interfaces;
a processor coupled to the one or more network interfaces and configured to execute one or more processes; and
a memory configured to store a process that is executable by the processor, the process when executed configured to:
receive an access request from a client to remotely access a device that is part of a subnet on a local network, wherein the local network comprises a different subnet for other devices that have some overlap in Internet Protocol addresses with devices that are part of the subnet;
generate a universally unique identifier for the access request;
send a response to the client having a one-time use domain name system name that is based on the universally unique identifier; and
communicate with a web proxy to authorize remote access of the device of the local network by the client.

12. The apparatus as in claim 11, wherein the apparatus generates the universally unique identifier for the access request randomly.

13. The apparatus as in claim 11, wherein the apparatus communicates with the web proxy to authorize the client to remotely access the device, in response to receiving an authorization request from the web proxy.

14. The apparatus as in claim 11, wherein the response to the client includes a uniform resource locator that points to the web proxy and comprises the one-time use domain name system name.

15. The apparatus as in claim 14, wherein the one-time use domain name system name uses the universally unique identifier as a prefix.

16. The apparatus as in claim 11, wherein the device has an Internet Protocol address that is also used by another device in the different subnet.

17. The apparatus as in claim 11, wherein the apparatus communicates with the web proxy to authorize remote access of the device of the local network comprises:
provide identification information for the device to the web proxy, wherein the web proxy uses the identification information for the device to forward an access request from the client to the device.

18. The apparatus as in claim 17, wherein the access request is forwarded to the device via a gateway of the local network.

19. The apparatus as in claim 11, wherein the process when executed is further configured to:
receive an authorization request from the web proxy that includes the universally unique identifier, after communicating with a web proxy to authorize remote access of the device of the local network by the client; and
deny that authorization request.

20. A tangible, non-transitory, computer-readable medium storing program instructions that cause a remote access manager to execute a process comprising:
receiving, at the remote access manager, an access request from a client to remotely access a device that is part of a subnet on a local network, wherein the local network comprises a different subnet for other devices that have some overlap in Internet Protocol addresses with devices that are part of the subnet;
generating, by the remote access manager, a universally unique identifier for the access request;
sending, by the remote access manager, a response to the client having a one-time use domain name system name that is based on the universally unique identifier; and
communicating, by the remote access manager, with a web proxy to authorize remote access of the device of the local network by the client.

* * * * *